US011956738B2

(12) United States Patent
Huang et al.

(10) Patent No.: US 11,956,738 B2
(45) Date of Patent: Apr. 9, 2024

(54) AUTOMATIC GAIN CONTROL FOR SERVING CELL ACTIVATION BASED ON TWO DIFFERENT REFERENCE SIGNALS

(71) Applicant: MEDIATEK INC., Hsinchu (TW)

(72) Inventors: Din-Hwa Huang, Hsinchu (TW); Tsang-Wei Yu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 209 days.

(21) Appl. No.: 17/617,658

(22) PCT Filed: Aug. 14, 2020

(86) PCT No.: PCT/CN2020/109278
§ 371 (c)(1),
(2) Date: Dec. 9, 2021

(87) PCT Pub. No.: WO2021/032009
PCT Pub. Date: Feb. 25, 2021

(65) Prior Publication Data
US 2022/0248347 A1    Aug. 4, 2022

Related U.S. Application Data

(60) Provisional application No. 62/888,038, filed on Aug. 16, 2019.

(51) Int. Cl.
*H04W 52/52* (2009.01)
*H04B 7/06* (2006.01)
*H04W 52/22* (2009.01)

(52) U.S. Cl.
CPC .......... *H04W 52/52* (2013.01); *H04B 7/0617* (2013.01); *H04W 52/225* (2013.01)

(58) Field of Classification Search
CPC ... H04W 52/52; H04W 52/225; H04B 7/0617
See application file for complete search history.

(56) References Cited

U.S. PATENT DOCUMENTS 4,642,468 A * 2/1987 Tabata ................ H01J 37/3045
250/548
5,541,785 A * 7/1996 Sasamoto .......... G11B 5/59622
360/77.05

(Continued)

FOREIGN PATENT DOCUMENTS

CN    109565830 A    4/2019
CN    110099459 A    8/2019

(Continued)

OTHER PUBLICATIONS

International Search Report dated Nov. 4, 2020, issued in application No. PCT/CN2020/109278.

(Continued)

*Primary Examiner* — Hai V Nguyen
(74) *Attorney, Agent, or Firm* — McClure, Qualey & Rodack, LLP

(57) ABSTRACT

A UE performs a cell activation process in a wireless network. The UE calculates a first automatic gain control (AGC) setting based on downlink signals from a base station. The downlink signals include a coarse beam reference signal, a fine beam reference signal, and a conversion indication that indicates a power conversion between the coarse beam reference signal and the fine beam reference signal. The UE further calculates a second AGC setting based on the first AGC setting and the conversion indication. The UE performs a cell search using one of the first AGC setting and the second AGC setting, and performs fine time-frequency tracking using the other of the first AGC setting and the second AGC setting.

20 Claims, 6 Drawing Sheets

(56) References Cited

U.S. PATENT DOCUMENTS

| | | | | |
|---|---|---|---|---|
| 5,642,358 | A * | 6/1997 | Dent | H01Q 25/00 370/320 |
| 5,917,865 | A * | 6/1999 | Kopmeiners | H03G 3/001 375/345 |
| 6,072,761 | A * | 6/2000 | Tani | G11B 7/126 369/53.26 |
| 6,118,815 | A * | 9/2000 | Hirth | H04L 25/03006 375/345 |
| 6,222,876 | B1 * | 4/2001 | Hirth | H04L 25/03885 375/232 |
| 6,236,625 | B1 * | 5/2001 | Schell | G11B 11/10595 369/13.22 |
| 6,324,387 | B1 * | 11/2001 | Kamgar | H03G 3/3052 375/345 |
| 6,434,087 | B1 * | 8/2002 | Schell | G11B 11/10506 369/13.02 |
| 6,791,915 | B1 * | 9/2004 | Lee | G11B 7/08505 |
| 6,868,263 | B2 * | 3/2005 | Filipovic | H03G 3/002 455/245.1 |
| 6,998,982 | B2 * | 2/2006 | Iwasawa | G08B 13/183 340/552 |
| 7,151,759 | B1 * | 12/2006 | Ryan | H03G 3/3078 370/335 |
| 7,397,872 | B2 * | 7/2008 | Komori | H03G 3/3052 375/345 |
| 7,885,627 | B2 * | 2/2011 | Lee | H04L 27/3809 455/234.1 |
| 7,916,798 | B2 * | 3/2011 | Aytur | H04L 27/2601 375/345 |
| 8,023,885 | B2 * | 9/2011 | Proctor, Jr. | H04B 7/1555 455/7 |
| 8,311,500 | B2 * | 11/2012 | Hirama | H03G 3/3052 455/226.2 |
| 8,331,892 | B2 * | 12/2012 | Kadous | H03G 3/3068 455/296 |
| 9,219,458 | B2 * | 12/2015 | Lee | H03G 3/3052 |
| 9,222,962 | B2 * | 12/2015 | Kondou | H03F 3/19 |
| 9,998,199 | B2 * | 6/2018 | Learned | H04B 7/086 |
| 10,674,535 | B2 * | 6/2020 | Liu | H04L 5/0092 |
| 10,686,513 | B2 * | 6/2020 | Learned | H04W 24/08 |
| 10,694,472 | B2 * | 6/2020 | Liu | H04W 52/241 |
| 10,784,950 | B2 * | 9/2020 | Kang | H04L 5/00 |
| 10,917,274 | B2 * | 2/2021 | Werner | H04L 5/0023 |
| 11,258,499 | B2 * | 2/2022 | Park | H04B 7/0695 |
| 11,329,713 | B2 * | 5/2022 | Kang | H04W 48/16 |
| 11,361,765 | B2 * | 6/2022 | Park | G10L 15/10 |
| 11,637,613 | B1 * | 4/2023 | Learned | H04J 11/0036 369/44.28 |
| 11,804,913 | B2 * | 10/2023 | Zhuang | H04B 17/104 |
| 11,843,498 | B2 | 12/2023 | Ko et al. | |
| 2003/0227986 | A1 * | 12/2003 | Filipovic | H04L 27/3809 375/345 |
| 2004/0037378 | A1 * | 2/2004 | Komori | H03G 3/3078 375/345 |
| 2004/0113779 | A1 * | 6/2004 | Iwasawa | G08B 13/183 340/545.3 |
| 2005/0009488 | A1 * | 1/2005 | Lee | H04L 27/0002 455/232.1 |
| 2005/0078596 | A1 * | 4/2005 | Filipovic | H04L 27/3809 370/203 |
| 2010/0061427 | A1 * | 3/2010 | Lopez-Risueno | G01C 21/206 375/150 |
| 2013/0107995 | A1 * | 5/2013 | Husted | H04B 7/0871 375/345 |
| 2015/0233981 | A1 * | 8/2015 | Kondou | H03F 3/19 375/345 |
| 2015/0311971 | A1 * | 10/2015 | Learned | H04B 7/086 370/329 |
| 2016/0073366 | A1 * | 3/2016 | Ng | H04W 24/10 370/329 |
| 2016/0234706 | A1 * | 8/2016 | Liu | H04L 27/2662 |
| 2017/0142751 | A1 * | 5/2017 | Liu | H04L 27/2613 |
| 2018/0048413 | A1 * | 2/2018 | Liu | H04W 76/27 |
| 2018/0332541 | A1 * | 11/2018 | Liu | H04W 52/10 |
| 2018/0367207 | A1 * | 12/2018 | Learned | H04W 24/08 |
| 2019/0166513 | A1 * | 5/2019 | Lin | H04W 24/10 |
| 2019/0253127 | A1 * | 8/2019 | Kang | H04B 7/0456 |
| 2019/0280909 | A1 * | 9/2019 | Werner | H04L 27/2613 |
| 2019/0342874 | A1 * | 11/2019 | Davydov | H04W 72/23 |
| 2019/0356445 | A1 * | 11/2019 | Manolakos | H04L 5/0051 |
| 2019/0364513 | A1 * | 11/2019 | Liu | H04W 72/23 |
| 2020/0036383 | A1 * | 1/2020 | Connell | H03B 5/06 |
| 2020/0074988 | A1 * | 3/2020 | Park | G06N 3/045 |
| 2020/0112355 | A1 * | 4/2020 | Park | H04L 5/0094 |
| 2020/0137602 | A1 * | 4/2020 | Zhang | H04W 72/23 |
| 2020/0296761 | A1 * | 9/2020 | Liu | H04L 5/0092 |
| 2020/0322932 | A1 * | 10/2020 | Kim | H04B 7/0695 |
| 2020/0359422 | A1 | 11/2020 | Xie et al. | |
| 2020/0382197 | A1 * | 12/2020 | Kang | H04W 72/542 |
| 2021/0274465 | A1 * | 9/2021 | Huang | H04J 11/0076 |
| 2021/0335354 | A1 * | 10/2021 | Park | G10L 15/063 |
| 2022/0051677 | A1 * | 2/2022 | Park | H04L 12/2829 |
| 2022/0209911 | A1 * | 6/2022 | Zou | H04W 52/028 |
| 2022/0264433 | A1 * | 8/2022 | Xiao | H04W 24/10 |
| 2022/0384956 | A1 * | 12/2022 | Alpman | H01Q 21/24 |
| 2023/0145401 | A1 * | 5/2023 | Alpman | H05K 1/0218 343/700 MS |
| 2023/0179465 | A1 * | 6/2023 | Lee | H04B 10/114 398/118 |
| 2023/0239126 | A1 * | 7/2023 | Liu | H04L 5/0048 370/329 |
| 2023/0354220 | A1 * | 11/2023 | Rastegardoost | H04L 5/003 |
| 2023/0354221 | A1 * | 11/2023 | Han | H04W 52/52 |

FOREIGN PATENT DOCUMENTS

| | | |
|---|---|---|
| CN | 110100492 A | 8/2019 |
| WO | 2018/128346 A1 | 7/2018 |
| WO | 2019/053630 A1 | 3/2019 |
| WO | WO-2022155620 A2 * | 7/2022 |

OTHER PUBLICATIONS

"Discussion on fast SCell activation based on Aperiodic TRS (ATRS)"; 3GPP TSG RAN WG2 Meeting #106 R2-1906461 (published on May 17, 2019).

"Discussion on NR SCell activation delay requirement"; 3GPP TSG-RAN WG4 Meeting #87 R4-1806459 (published on May 25, 2018).

"Remaining issues on reference signal and QCL"; 3GPP TSG RAN WG1 Meeting #94b R1-1810752 (published on Oct. 12, 2018).

Chinese language office action dated Dec. 29, 2023, issued in application No. CN 202080012341.4.

* cited by examiner

ID
AUTOMATIC GAIN CONTROL FOR SERVING CELL ACTIVATION BASED ON TWO DIFFERENT REFERENCE SIGNALS

CROSS-REFERENCE TO RELATED APPLICATIONS

This application claims the benefit of U.S. Provisional Application No. 62/888,038 filed on Aug. 16, 2019, the entirety of which is incorporated by reference herein.

TECHNICAL FIELD

Embodiments of the invention relate to wireless communications; more specifically, to the acceleration of cell activation in a wireless network that provides two or more different reference signals to a user equipment (UE).

BACKGROUND

The Fifth Generation New Radio (5G NR) is a telecommunication standard for mobile broadband communications. 5G NR is promulgated by the 3rd Generation Partnership Project (3GPP™) to significantly improve on performance metrics such as latency, reliability, throughput, etc. Some aspects of 5G NR may be based on the 4G Long Term Evolution (LTE) standard. A 5G NR network can operate in a spectrum above 24 GHz, which is also known as the millimeter wave (mmWave) range.

Current wireless communication technologies enable the use of antenna arrays with a relatively large number of antenna elements that occupy a small footprint on both base stations and user equipment (UEs). Such antenna arrays can perform advanced beamforming operations to concentrate the overall radiated power on small angles, and to adaptively form beam patterns with different beam widths. For example, a base station can sweep coarse beams to broadcast system information in a coverage area, and can direct fine beams to specific UEs. A UE can likewise transmit and receive beamformed signals via its antenna arrays.

Based on the beamformed downlink signals from a base station, a UE performs a cell activation process to identify and activate a serving cell. For example, a network may request a UE to activate a secondary serving cell which provides a secondary component carrier for carrier aggregation. Improvement of the cell activation process benefits network operators and users of wireless communications. The improvement can apply to a wide range of multi-access technologies and the telecommunication standards that employ these technologies.

SUMMARY

In one embodiment, a method is provided for a UE to perform a cell activation process in a wireless network. The method comprises calculating a first automatic gain control (AGC) setting based on downlink signals from a base station. The downlink signals include a coarse beam reference signal, a fine beam reference signal, and a conversion indication that indicates a power conversion between the coarse beam reference signal and the fine beam reference signal. The method further comprises calculating a second AGC setting based on the first AGC setting and the conversion indication; performing a cell search using one of the first AGC setting and the second AGC setting; and performing fine time-frequency tracking using the other of the first AGC setting and the second AGC setting.

In another embodiment, an apparatus is provided for wireless communication. The apparatus is a UE in one embodiment. The apparatus comprises antenna circuitry; a memory; and processing circuitry coupled to the memory and operative to perform a cell activation process. The processing circuitry is operative to calculate a first AGC setting based on downlink signals received from a base station via the antenna circuitry. The downlink signals include a coarse beam reference signal, a fine beam reference signal, and a conversion indication that indicates a power conversion between the coarse beam reference signal and the fine beam reference signal. The processing circuitry is further operative to calculate a second AGC setting based on the first AGC setting and the conversion indication; perform a cell search using one of the first AGC setting and the second AGC setting; and perform fine time-frequency tracking using the other of the first AGC setting and the second AGC setting.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
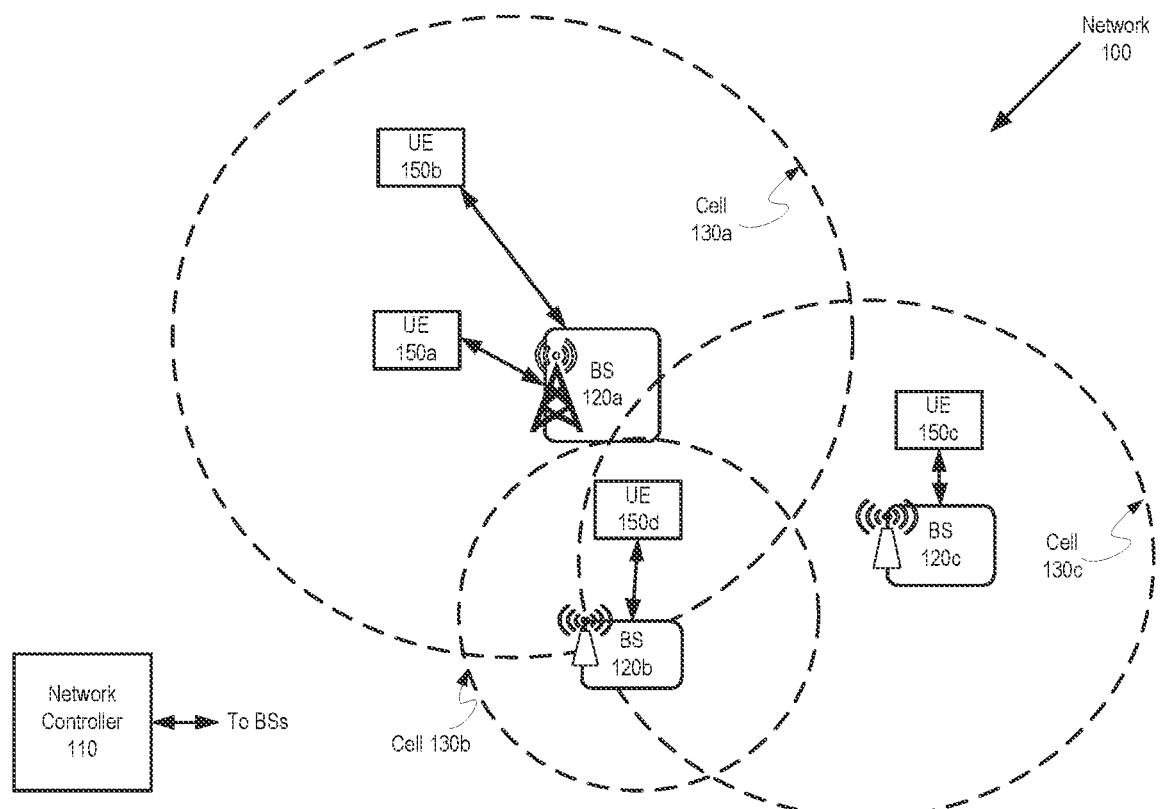
FIG. 1 is a diagram illustrating a network in which the embodiments of the present invention may be practiced.

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a mechanism for a UE to accelerate a cell activation process in a wireless network. Wireless signal power received by a UE can vary from time to time due to multipath propagations, interferences from other signals, path loss fluctuations, etc. Thus, a UE typically performs automatic gain control (AGC) gain tuning on a received signal to stabilize the received power. A UE performs AGC gain tuning on received downlink reference signals by first calculating AGC settings for these reference signals. The cell activation process may be accelerated by reducing the time it takes for the UE to receive an adequate number of samples (e.g., two samples) of the reference signals for calculating the AGC settings.

The cell activation process includes at least a cell search operation followed by a fine time-frequency tracking operation based on signals provided by a base station. The cell search operation is performed based on a coarse beam reference signal ("coarse beam RS"), and the fine time-frequency tracking operation is performed based on a fine beam reference signal ("fine beam RS"). An example of the coarse beam RS is the synchronization signal block (SSB), also referred to as the synchronization signal/physical broadcast channel block (SS/PBCH block). An SSB is detected by a UE during an SSB-based measurement timing configuration (SMTC) window. An example of the fine beam RS is a temporary reference signal, which may be periodic, aperiodic, or semi-persistent. A base station may transmit a temporary reference signal to a UE at least during the cell activation process.

Examples of a temporary reference signal includes a tracking reference signal (TRS) and a channel state information reference signal (CSI-RS), and may also include other downlink reference signals. In one embodiment, a UE may be configured to receive SSBs outside SMTC windows and use these SSBs as the temporary reference signal. Alternative reference signals may be used in some embodiments. In the disclosure herein, the coarse beam RS and the fine beam RS are collectively referred to as reference signals.

The fine beam RS may be transmitted more frequently than the coarse beam RS during the cell activation process. In one embodiment, a fine beam RS is available for UE reception between two samples of the coarse beam RS. In one embodiment, the coarse beam RS has a longer periodicity than the fine beam RS during the cell activation process. For the purpose of calculating an AGC setting, a UE may use at least two reference signal samples; e.g., one sample of the coarse beam RS and one sample of the fine beam RS. As will be described in detail with reference to FIG. 4, collecting both samples from the coarse beam RS takes a longer time than collecting one sample from each of the coarse beam RS and the fine beam RS. By reducing the sample collection time for AGC calculation, the cell activation process can be accelerated.

The disclosed method, as well as the apparatus and the computer product implementing the method, can be applied to wireless communication between a base station (e.g., a gNB in a 5G NR network) and UEs. It is noted that while the disclosed embodiments may be described herein using terminology commonly associated with 5G or NR wireless technologies, the present disclosure can be applied to other multi-access technologies and the telecommunication standards that employ these technologies.

FIG. 1 is a diagram illustrating a network 100 in which embodiments of the present invention may be practiced. The network 100 is a wireless network which may be a 5G NR network. To simplify the discussion, the methods and apparatuses are described within the context of a 5G NR network. However, one of ordinary skill in the art would understand that the methods and apparatuses described herein may be applicable to a variety of other multi-access technologies and the telecommunication standards that employ these technologies.

The number and arrangement of wireless entities (e.g., devices, base stations, etc.) shown in FIG. 1 are provided as an example. In practice, the network 100 may include additional wireless entities, fewer wireless entities, different wireless entities, or differently arranged wireless entities than those shown in FIG. 1.

Referring to FIG. 1, the network 100 may include a number of base stations (shown as BSs), such as base stations 120*a*, 120*b*, and 120*c*, collectively referred to as base stations 120. In some network environments such as a 5G NR network, a base station may be known as a gNodeB, a gNB, and/or the like. In an alternative network environment, a base station may be known by other names. A base station 120 may provide communication coverage for a particular geographic area known as a cell, such as a cell 130*a*, 130*b* or 130*c*, collectively referred to as cells 130. The radius of a cell size may range from several kilometers to a few meters. A base station may communicate with one or more other base stations or network entities directly or indirectly via a wireless or wireline backhaul.

A network controller 110 may be coupled to a set of base stations such as the base stations 120 to coordinate, configure, and control these base stations 120. The network controller 110 may communicate with the base stations 120 via a backhaul.

The network 100 further includes a number of UEs, such as UEs 150*a*, 150*b*, 150*c*, and 150*d*, collectively referred to as UEs 150. The UEs 150 may be anywhere in the network 100, and each UE 150 may be stationary or mobile. The UEs 150 may also be known by other names, such as mobile stations, subscriber units, wireless devices, and/or the like. Some of the UEs 150 may be implemented as part of a vehicle. Examples of the UEs 150 may include a cellular phone (e.g., a smartphone), a wireless communication device, a handheld device, a laptop computer, a cordless phone, a tablet, a gaming device, a wearable device, an entertainment device, a sensor, an infotainment device, an Internet-of-Things (IoT) device, or any device that can communicate via a wireless medium. The transmission from a UE to a base station is called uplink transmission, and from a base station to a UE is called downlink transmission.

In one embodiment, each of the UEs 150 provides layer 3 functionalities through a radio resource control (RRC) layer, which is associated with the transfer of system information, connection control, and measurement configurations. Each of the UEs 150 further provides layer 2 functionalities through a packet data convergence protocol (PDCP) layer, a radio link control (RLC) layer, and a medium access control (MAC) layer. The PDCP layer is associated with header compression/decompression, security, and handover support. The RLC layer is associated with the transfer of packet data units (PDUs), error correction through automatic repeat request (ARQ), concatenation, segmentation, and reassembly of RLC service data units (SDUs). The MAC layer is associated with the mapping between logical channels and transport channels, multiplexing of MAC SDUs onto transport blocks (TBs), de-multiplexing of MAC SDUs from TBs, scheduling information reporting, error correction through HARQ, priority handling, and logical channel prioritization. Each of the UEs 150 further provides layer 1 functionalities through a physical (PHY) layer, which is associated with error detection on the transport channels, forward error correction (FEC) coding/decoding of the transport channels, interleaving, rate matching, mapping onto physical channels, modulation/demodulation of physical channels, and multiple-input and multiple-output (MIMO) antenna processing, etc.

In one embodiment, the UEs 150 may communicate with their respective base stations 120 that serve their respective cells 130. A UE may have more than one serving cell. For example, UE 150a may have cell 130a as its primary serving cell. The network 100 may (e.g., via base station 120a) request UE 150a to add cell 130c, which is unknown to UE 150a at this time, as its secondary serving cell. In response, UE 150a performs a cell search to acquire synchronization information and to decode the cell ID of cell 130c. The cell search is based on the information in an SSB. Following the cell search, UE 150a performs fine time-frequency tracking to synchronize with the identified cell. The fine time-frequency tracking may be based on the information in a temporary tracking signal such as TRS, CSI-RS, etc.

NR supports multiple configurations for time domain and frequency domain resource allocations. With respect to time resources, a frame may be 10 milliseconds (ms) in length, and may be divided into ten subframes of 1 ms each. Each subframe may be further divided into multiple equal-length time slots (also referred to as slots), and the number of slots per subframe may be different in different configurations. Each slot may be further divided into multiple equal-length symbol durations (also referred to as symbols); e.g., 7 or 14 symbols. With respect to frequency resources, NR supports multiple different subcarrier bandwidths. Contiguous subcarriers (also referred to as resource elements (REs)) are grouped into one resource block (RB). In one configuration, one RB contains 12 subcarriers. A "carrier" as used herein refers to the bandwidth configured for a serving cell.

A UE performs a cell search to acquire time and frequency synchronization with a cell, and decode the cell ID of that cell. The cell ID is decoded based on information in the SSB.

Figure 2A:
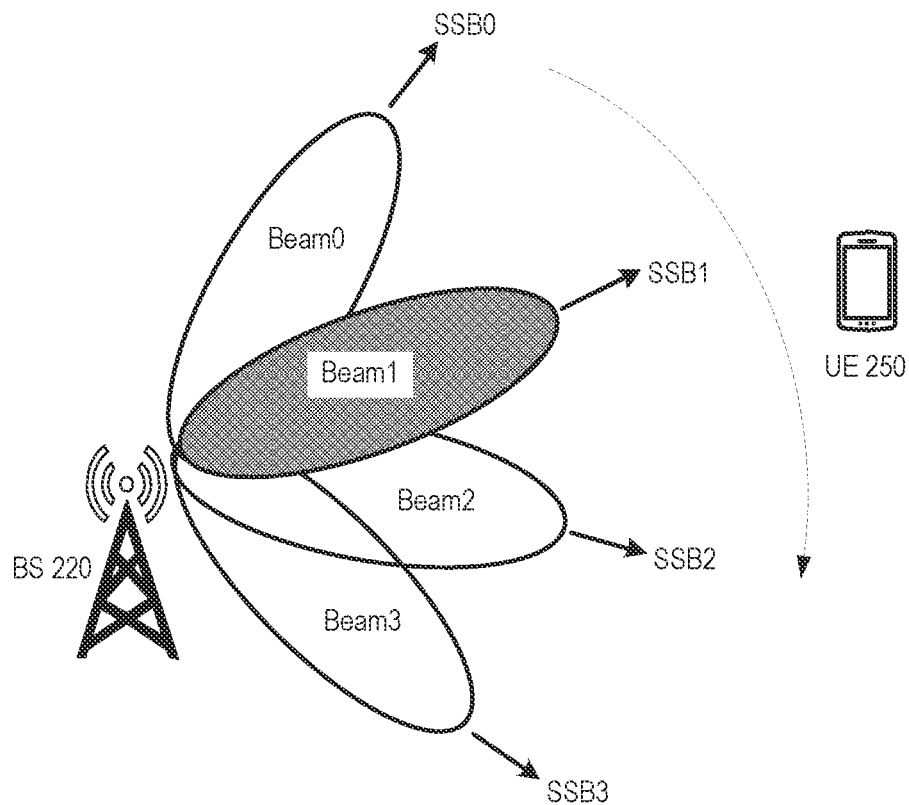
FIG. 2A illustrates the downlink transmission of coarse beams according to one embodiment.
Figure 2B:
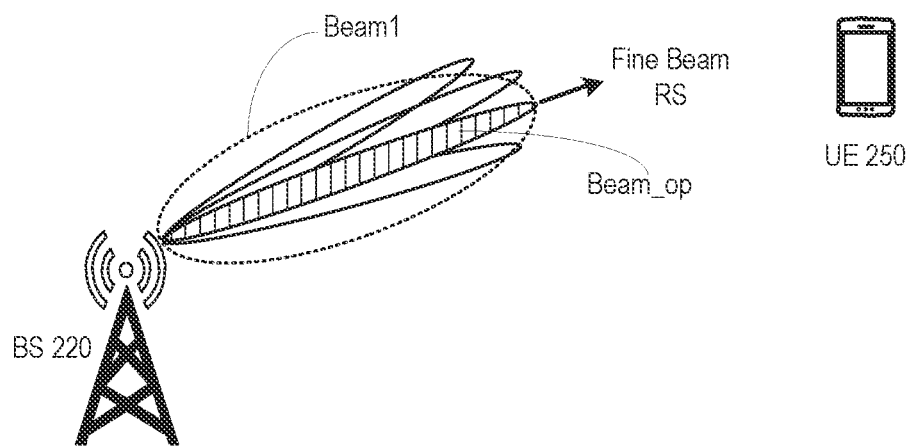
FIG. 2B illustrates the downlink transmission of fine beams according to one embodiment.

FIG. 2A and FIG. 2B illustrate beamformed signals transmitted from a base station 220 to a UE 250 according to some embodiments. The base station 220 may be any of the base stations 120 in FIG. 1, and the UE 250 may be any of the UEs 150 in FIG. 1. The base station 220 includes MIMO antenna arrays for performing adaptive beam steering and tracking in both the uplink direction and downlink direction. The MIMO antenna arrays can form both coarse beams and fine beams.

The base station 220 performs a beam sweep operation, which changes the transmit direction for each coarse beam RS in a sweep cycle. In the example shown in FIG. 2A, the base station 220 generates four coarse beams (e.g., Beam0, Beam1, Beam2, and Beam3) in a sweep cycle, each of which transmits an SSB in a direction different from the others. For example, the base station 220 may transmit the coarse beams (along the direction shown by the dotted arrow) in the sequential order of Beam0, Beam1, Beam2, and Beam3 in a sweep cycle. The four beams transmit SSB1, SSB2, SSB3, and SSB4, which form an SSB burst. These coarse beams may be cell-specific; that is, they are broadcast to the entire cell coverage area served by the base station 220. The base station 220 may repeat the beam sweep operation periodically, and generate an SSB burst in each sweep cycle. In an alternative embodiment, a base station may generate a different number of coarse beams and a different beam sweep sequence from what is shown in FIG. 2A.

The UE 250 listens for coarse beam RSs in different directions according to the sequence (e.g., Beam0, Beam1, Beam2, and Beam3). In this example, the UE 250 receives the strongest signal strength in the direction of Beam1, which carries the coarse beam RS SSB1. The UE 250 uses the direction where the strongest signal strength is received to transmit uplink signals, which may likewise be beamformed signals, to the base station 220. Referring to the example in FIG. 2B, when the base station 220 receives the uplink signals from the UE 250, the base station 220 determines an optimal direction (e.g., Beam op) for transmitting a fine beam RS to the UE 250. Beam op has a narrower beamwidth than Beam1, and its main lobe (shown in a stripe pattern) may overlap with the main lobe of Beam1 (shown in a dotted outline). In one embodiment, the fine beam RS is UE-specific; that is, the base station 220 may transmit the fine beam RS specifically to the UE 250.

Examples of the fine beam RS include, among others, TRS and CSI-RS, both of which are downlink reference signals transmitted by a base station in orthogonal frequency-division multiplexing (OFDM) symbols. When a UE receives CSI-RS from a base station, the UE estimates the channel and reports channel quality information back to the base station. Additionally, a UE may perform fine time-frequency tracking based on CSI-RS or TRS.

Figure 3:
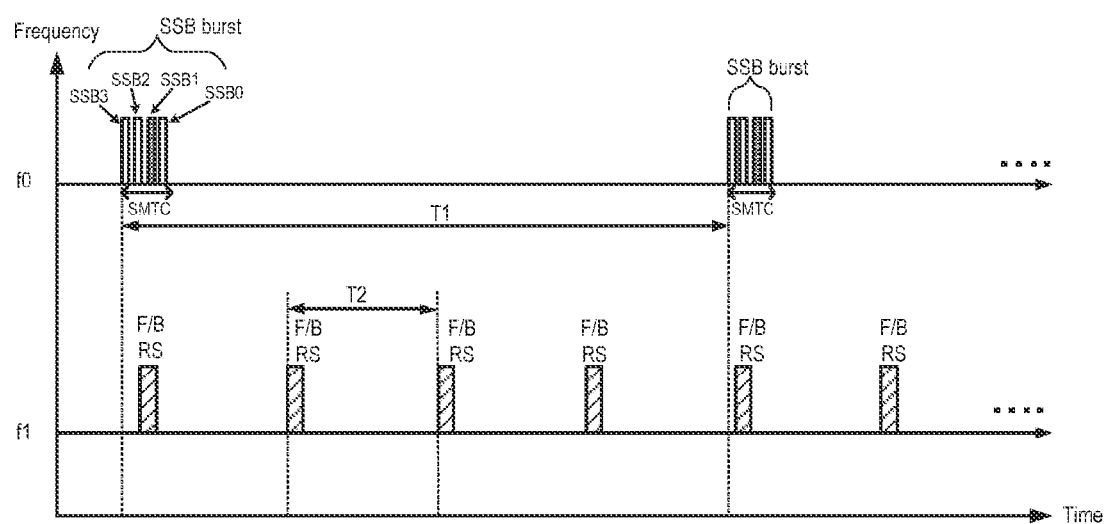
FIG. 3 is a diagram illustrating a timing sequence of reference signals according to one embodiment.

FIG. 3 is a diagram illustrating a timing sequence of a coarse beam RS and a fine beam RS (shown as "F/B RS") according to one embodiment. In this example, the coarse beam RS is a sequence of SSB bursts. Each SSB in an SSB burst is transmitted in OFDM symbols and is identified by an SSB index. The UE receives the SSB bursts according to a preconfigured SMTC, which specifies a window size and periodicity of SMTC for receiving and measuring the SSBs.

Within each STMC window, the UE receives an SSB burst containing N number of SSBs, where N is an integer (e.g., four in the example of FIG. 3). Different SSBs in an SSB burst are transmitted via downlink coarse beams pointing at different directions. The UE measures the signal strength (e.g., power) of each SSB in an SSB burst, and identifies the SSB index with the strongest signal strength. The identified SSB index (e.g., SSB1) is reported back to the base station for the base station to fine-tune the transmission of the fine beam RS.

In the example of FIG. 3, both the coarse beam RS and the fine beam RS are periodic during the cell activation process. For example, the periodicity of the SMTC window is T1, and fine beam RS has a periodicity of T2, where T2<T1.

Figure 4:
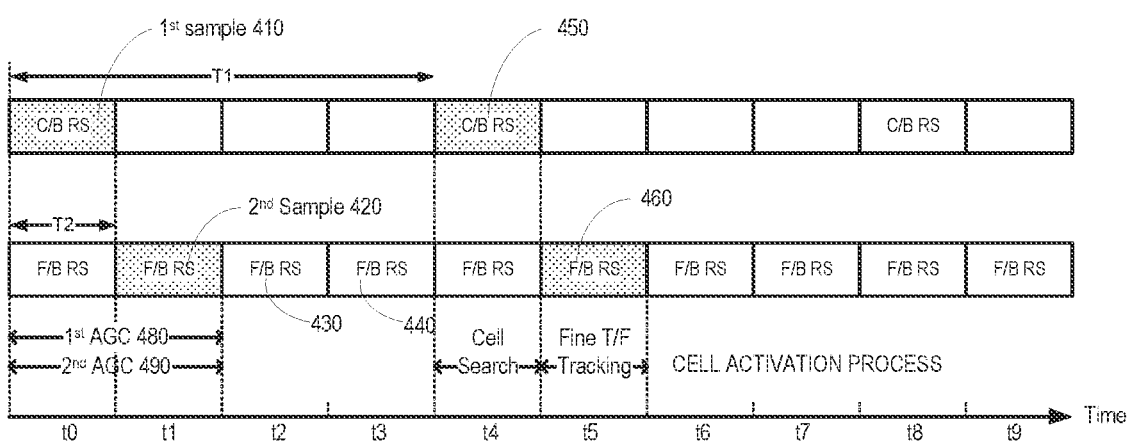
FIG. 4 is a diagram illustrating a timing sequence of a cell activation process according to one embodiment.

FIG. 4 is a diagram illustrating a timing sequence of a cell activation process according to one embodiment. The top row of blocks shows the time periods (with periodicity T1) during which a coarse beam RS (shown as "CB RS") can be received by a UE. The second to top row of blocks shows the time periods (with periodicity T2) during which a fine beam RS (shown as "F/B RS") can be received by a UE. Each block represents a corresponding time period (t0, t1, t2, etc.). It should be understood that a coarse beam RS or a fine beam RS may be received anytime within the labeled time period, and the reception time does not necessarily span over an entire labeled block.

Each block with a dotted pattern indicates that the reference signal received within the corresponding time period is used by the UE for the cell activation process. For example, the UE may use the coarse beam RS received at t0 (the first SMTC window) as a first sample 410. The UE may use the fine beam RS received in a time duration between the first SMTC window (t0) and the second SMTC window (t4) as the second sample. The second SMTC window is the next SMTC window subsequent to the first SMTC window. For example, the UE may use the fine beam RS received at t1 as a second sample 420. In alternative embodiments, the UE may use the fine beam RS received at t2 or t3 as a second sample 430 or 440, respectively. After calculating AGC settings using the two samples, the UE performs the cell search operation during the second SMTC window at t4, and performs the fine time-frequency tracking operation at t5, which is immediately after the second SMTC window.

The UE may use the first sample 410 and the second sample 420 to calculate a first AGC setting 480 for the cell search operation. For example, the UE may use the two samples 410 and 420 to calculate the reference signal power, such as Reference Signal Received Power (RSRP) or Received Signal Strength Indicator (RSSI), and then calculate or adjust the first AGC setting 480 based on the reference signal power. Additionally or alternatively, the UE may use the first sample 410 and the second sample 420 to calculate a second AGC setting 490 for the fine time-frequency tracking operation. For example, the UE may use the two samples 410 and 420 to calculate the reference signal power, such as RSRP or RSSI, and then calculate or adjust the second AGC setting 490 based on the reference signal power.

To calculate the AGC settings using samples from two different reference signals, the UE applies a conversion indication received from the base station to convert the signal power between the coarse beam RS and the fine beam RS. For example, the conversion indication may indicate that the coarse beam RS and the fine beam RS are transmitted from the base station with an equal amount of power, where the power may be measured, for example, by the average resource element (RE) power (i.e., the average power in an RE). A resource element (RE) is a frequency resource in NR, and it consists of one subcarrier during one OFDM symbol. Alternatively, the conversion indication may indicate a ratio between the power transmitted in a coarse beam RS and a fine beam RS, where the power may be measured, for example, by the average RE power. Alternatively, the conversion indication may indicate an offset of the fine beam RS transmission power relative to the coarse beam transmission power. For example, the conversion indication may provide an offset of the CSI-RS transmission power relative to the SS/PBCH block transmission power. In one embodiment, the conversion indication may indicate a quasi-colocation (QCL) type with respect to the average RE power for the coarse beam RS and the fine beam RS. Other types of downlink signaling may be used for a network to convey the conversion indication to a UE.

Using the conversion indication, the UE may convert the average RE power in the second sample 420 (of a fine beam RS) to the average RE power in a coarse beam RS sample (referred to as a converted coarse sample). The UE may further compute the total power in the converted coarse sample. This total power, combined with the received total power in the first sample 410, provides the UE with the two samples needed for calculating the first AGC setting 480 for the cell search operation.

Similarly, using the conversion indication, the UE may convert the average RE power in the first sample 410 (of a coarse beam RS) to the average RE power in a fine beam RS sample (referred to as a converted fine sample). The UE may further compute the total power in the converted fine sample. This total power, combined with the received total power in the second sample 420, provides the UE with the two samples needed for calculating the second AGC setting 490 for the fine time-frequency tracking operation.

In one embodiment, after the UE computes the first AGC setting 480, the UE may compute the second AGC setting 490 based on the first AGC setting 480 and the conversion indication. Alternatively, after UE computes the second AGC setting 490, the UE may compute the first AGC setting 480 based on the second AGC setting 490 and the conversion indication.

The UE performs the cell search operation to search for cell ID and identify other system information based on the first AGC setting 480 and the coarse beam RS 450 received in a second SMTC window (at t4). Subsequently, the UE performs the fine time-frequency tracking operation based on the second AGC setting 490 and the fine beam RS 460 received at t5, which in this example is immediately after the second SMTC window. Thus, the total time for the cell search and the fine time-frequency tracking operations, in this example, is the total time period from t0 to t5, which spans across two SMTC windows plus the time for the fine time-frequency tracking operation.

In contrast, when a UE calculates the first AGC setting 480 based on two consecutive samples of the coarse beam RS (e.g., at t0 and t4), the earliest time for the UE to perform a cell search operation is at the third STMC window at t8. The fine time-frequency tracking operation would be performed at t9 following the cell search. The total time for the cell search and the fine time-frequency tracking operations would be the total time period from t0 to t9, which spans across three SMTC windows plus the time for the fine time-frequency tracking operation. This total time is longer than the aforementioned time period from t0 to t5 shown in FIG. 4. Thus, the cell activation process may be accelerated when a UE uses samples from two different reference signals for calculating AGC settings.

Figure 5:
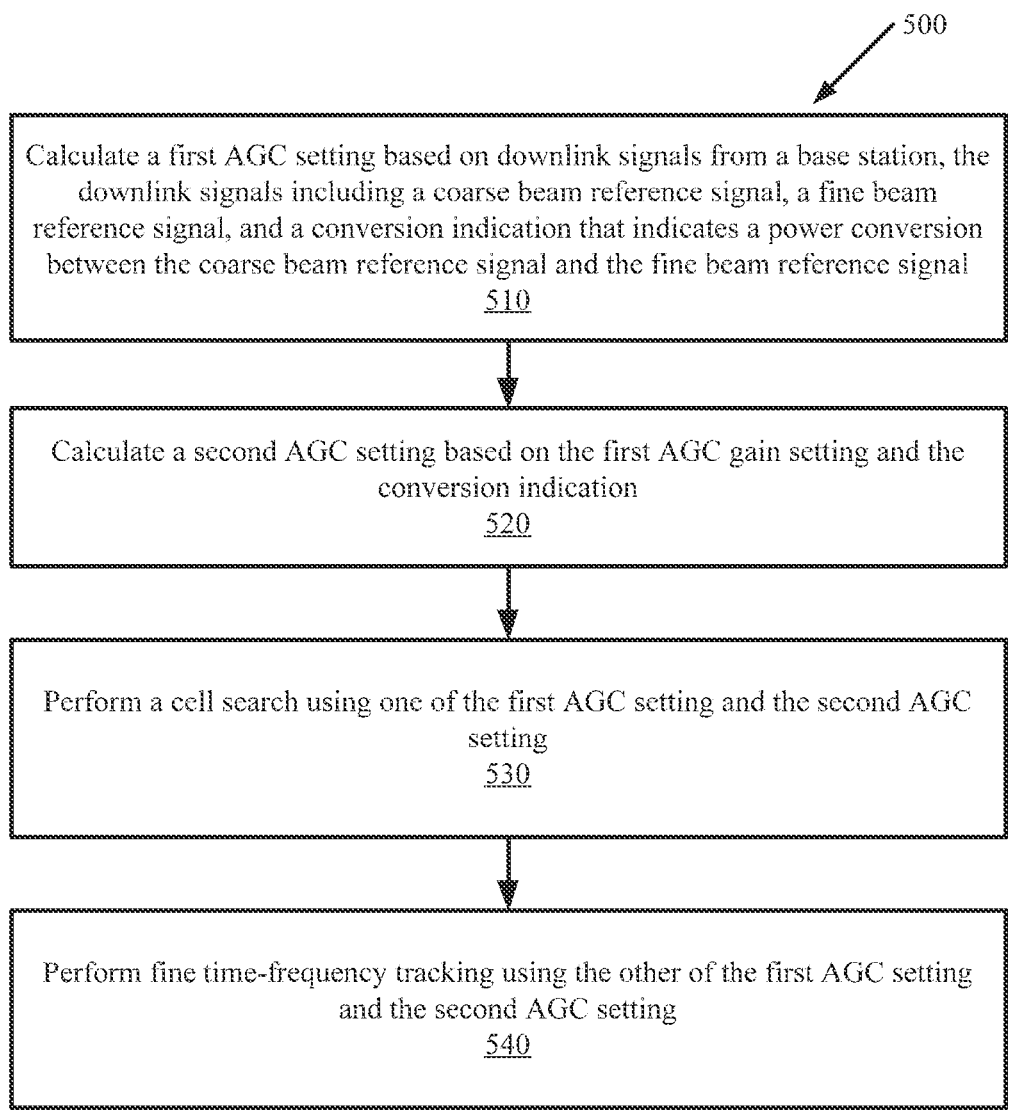
FIG. 5 is a flow diagram illustrating a method for a UE to perform a cell activation process according to one embodiment.

FIG. 5 is a flow diagram illustrating a method 500 for a UE in a wireless network to perform a cell activation process according to one embodiment. The UE may be any of the UEs 150 in FIG. 1 and/or UE 600 in FIG. 6. The method 500 starts at step 510 when the UE calculates a first AGC setting based on downlink signals from a base station, the downlink signals including a coarse beam RS, a fine beam RS and a conversion indication that indicates a power conversion between the coarse beam RS and the fine beam RS. The UE at step 520 calculates a second AGC setting based on the first AGC setting and the conversion indication. The UE at step 530 performs a cell search using one of the first AGC setting and the second AGC setting. The UE at step 540 performs fine time-frequency tracking using the other of the first AGC setting and the second AGC setting.

Figure 6:
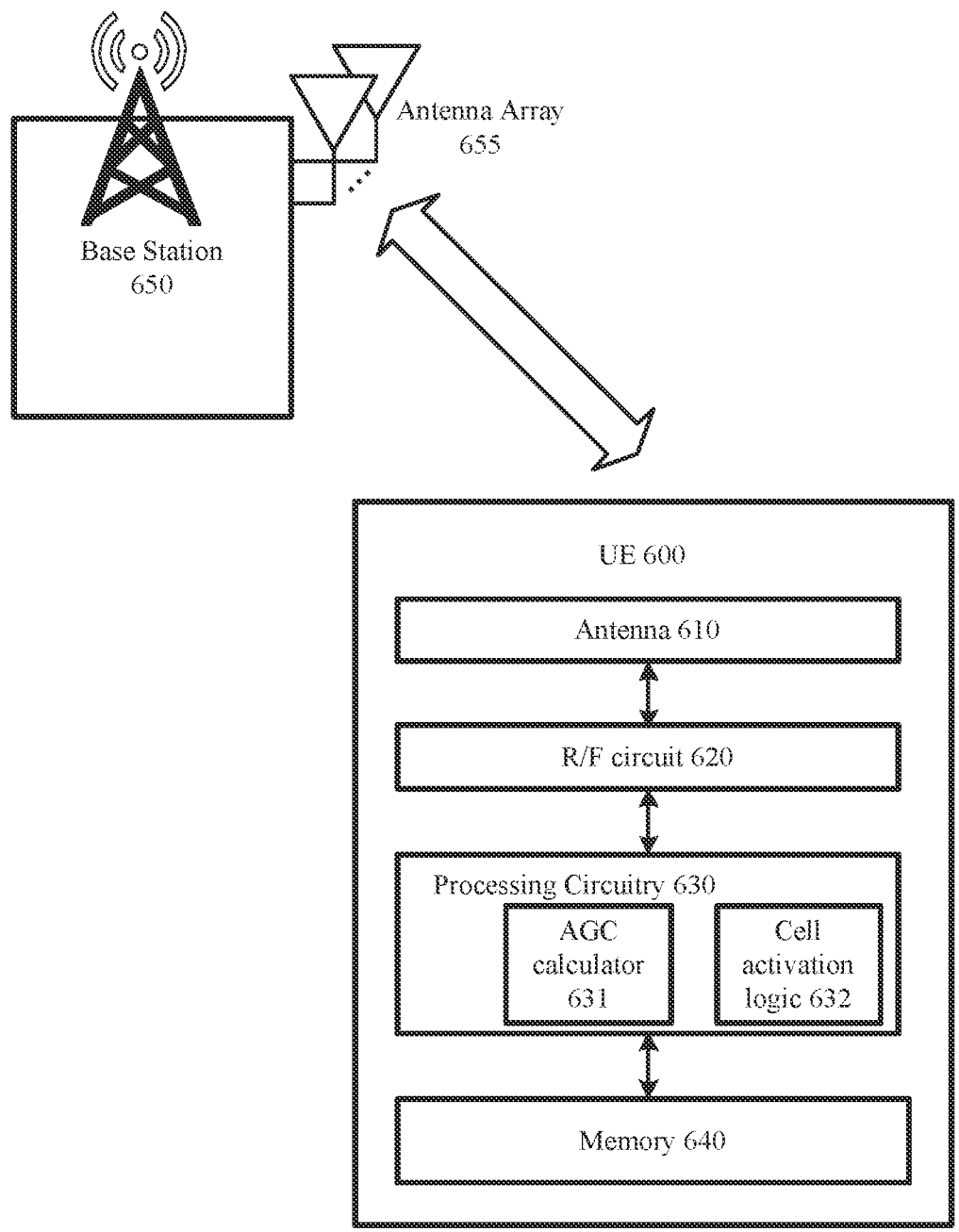
FIG. 6 is a block diagram illustrating a UE in wireless communication with a base station according to one embodiment.

FIG. 6 is a block diagram illustrating elements of a UE 600 operative to perform wireless communication with a base station 650 according to one embodiment. The base station 650 may be any of the base stations 120 and the UE 600 may be any of the UEs 150 in FIG. 1. The base station 650 includes an antenna array 655 to form coarse beams and fine beams for transmitting downlink signals, including the aforementioned coarse beam RS and the fine beam RS.

As shown, the UE 600 may include an antenna 610, and a radio frequency (RF) circuitry 620 including a transmitter and a receiver configured to provide radio communications with another station in a radio access network, such as the base station 650. The transmitter and the receiver may include filters in the digital front end for each cluster, and each filter can be enabled to pass signals and disabled to block signals. The UE 600 may also include processing circuitry 630 which may include one or more control processors, signal processors, central processing units, cores, and/or processor cores. In one embodiment, the processing circuitry 630 includes an AGC calculator 631 for calculating AGC settings in accordance with method 500 in FIG. 5. The processing circuitry 630 also includes cell activation logic 632, which uses the calculated AGC settings to perform cell search and fine time-frequency tracking operations. The UE 600 may also include a memory circuit (also referred to as memory 640) coupled to the processing circuitry 630. The UE 600 may also include an interface (such as a user interface). The UE 600 may be incorporated into a wireless system, a station, a terminal, a device, an appliance, a machine, and IoT operable to perform wireless communication in a cell with shared spectrum channel access, such as a 5G NR network. It is understood the embodiment of FIG. 6 is simplified for illustration purposes. Additional hardware components may be included.

In one embodiment, the UE 600 may store and transmit (internally and/or with other electronic devices over a network) code (composed of software instructions) and data using computer-readable media, such as non-transitory tangible computer-readable media (e.g., computer-readable storage media such as magnetic disks; optical disks; read-only memory; flash memory devices) and transitory computer-readable transmission media (e.g., electrical, optical, acoustical or other forms of propagated signals). For example, the memory 640 may include a non-transitory computer-readable storage medium that stores computer-readable program code. The code, when executed by the processors, causes the processors to perform operations according to embodiments disclosed herein, such as the method disclosed in FIG. 5.

Although the UE 600 is used in this disclosure as an example, it is understood that the methodology described herein is applicable to any computing and/or communication device capable of performing wireless communications.

The operations of the flow diagram of FIG. 5 have been described with reference to the exemplary embodiments of FIGS. 1 and 6. However, it should be understood that the operations of the flow diagram of FIG. 5 can be performed by embodiments of the invention other than the embodiments of FIGS. 1 and 6, and the embodiments of FIGS. 1 and 6 can perform operations different than those discussed with reference to the flow diagram. While the flow diagram of FIG. 5 shows a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

The invention claimed is:

1. A method for a UE to perform a cell activation process in a wireless network, comprising:
   calculating a first automatic gain control (AGC) setting based on downlink signals from a base station, the downlink signals including a coarse beam reference signal, a fine beam reference signal, and a conversion indication that indicates a power conversion between the coarse beam reference signal and the fine beam reference signal;
   calculating a second AGC setting based on the first AGC setting and the conversion indication;
   performing a cell search using one of the first AGC setting and the second AGC setting; and
   performing fine time-frequency tracking using the other of the first AGC setting and the second AGC setting.

2. The method of claim 1, wherein the conversion indication indicates an offset in power between the coarse beam reference signal and the fine beam reference signal.

3. The method of claim 1, wherein the conversion indication indicates a ratio in power between the coarse beam reference signal and the fine beam reference signal.

4. The method of claim 1, wherein the conversion indication indicates a quasi-colocation (QCL) type with respect to an average resource element (RE) power of the coarse beam reference signal and the fine beam reference signal.

5. The method of claim 1, wherein the coarse beam reference signal is a synchronization signal block (SSB), and the fine beam reference signal is a temporary reference signal transmitted at least during the cell activation process.

6. The method of claim 1, wherein the coarse beam reference signal is an SSB, and the fine beam reference signal is a tracking reference signal (TRS) or a channel state information reference signal (CSI-RS).

7. The method of claim 1, wherein the coarse beam reference signal has a longer periodicity than the fine beam reference signal during the cell activation process.

8. The method of claim 1, further comprising:
   receiving the coarse beam reference signal in a first SSB-based measurement timing configuration (SMTC) window; and
   performing the cell search in a second SMTC window subsequent to the first SMTC window.

9. The method of claim 8, further comprising:
   receiving the fine beam reference signal in a first time duration between the first SMTC window and the second SMTC window; and
   performing the fine time-frequency tracking in a second time duration immediately after the second SMTC window.

10. The method in claim 1, wherein calculating the first AGC setting further comprises:
    measuring an average resource element (RE) power of the coarse beam reference signal;
    calculating a total power of the fine beam reference signal based on the measured average RE power of the coarse beam reference signal; and
    calculating the first AGC setting based on, at least in part, the calculated total power of the fine beam reference signal.

11. The method in claim 1, wherein calculating the first AGC setting further comprises:
    measuring an average resource element (RE) power of the fine beam reference signal;
    calculating a total power of the coarse beam reference signal based on the measured average RE power of the fine beam reference signal; and
    calculating the first AGC setting based on, at least in part, the calculated total power of the coarse beam reference signal.

12. An apparatus for wireless communication, the apparatus being a user equipment terminal (UE), comprising:
    antenna circuitry;
    a memory; and processing circuitry coupled to the memory and operative to perform a cell activation process, the processing circuitry further operative to:
calculate a first automatic gain control (AGC) setting based on downlink signals received from a base station via the antenna circuitry, the downlink signals including a coarse beam reference signal, a fine beam reference signal, and a conversion indication that indicates a power conversion between the coarse beam reference signal and the fine beam reference signal;
calculate a second AGC setting based on the first AGC setting and the conversion indication;
perform a cell search using one of the first AGC setting and the second AGC setting; and
perform fine time-frequency tracking using the other of the first AGC setting and the second AGC setting.

13. The apparatus of claim 12, wherein the conversion indication indicates an offset or a ratio in power between the coarse beam reference signal and the fine beam reference signal.

14. The apparatus of claim 12, wherein the conversion indication indicates a quasi-colocation (QCL) type with respect to an average resource element (RE) power of the coarse beam reference signal and the fine beam reference signal.

15. The apparatus of claim 12, wherein the coarse beam reference signal is a synchronization signal block (SSB), and the fine beam reference signal is a temporary reference signal transmitted at least during the cell activation process.

16. The apparatus of claim 12, wherein the coarse beam reference signal is an SSB, and the fine beam reference signal is a tracking reference signal (TRS) or a channel state information reference signal (CSI-RS).

17. The apparatus of claim 12, wherein the coarse beam reference signal has a longer periodicity than the fine beam reference signal during the cell activation process.

18. The apparatus of claim 12, wherein the processing circuitry is further operative to:
receive the coarse beam reference signal in a first SSB-based measurement timing configuration (SMTC) window;
receive the fine beam reference signal in a first time duration between the first SMTC window and a second SMTC window subsequent to the first SMTC window;
perform the cell search in the second SMTC window; and
perform the fine time-frequency tracking in a second time duration immediately after the second SMTC window.

19. The apparatus of claim 12, wherein the processing circuitry when calculating the first AGC setting is further operative to:
measure an average resource element (RE) power of the coarse beam reference signal;
calculate a total power of the fine beam reference signal based on the measured average RE power of the coarse beam reference signal; and
calculate the first AGC setting based on, at least in part, the calculated total power of the fine beam reference signal.

20. The apparatus of claim 12, wherein the processing circuitry when calculating the first AGC setting is further operative to:
measure an average resource element (RE) power of the fine beam reference signal;
calculate a total power of the coarse beam reference signal based on the measured average RE power of the fine beam reference signal; and
calculate the first AGC setting based on, at least in part, the calculated total power of the coarse beam reference signal.

* * * * *